US006799732B2

(12) United States Patent
Sirkin

(10) Patent No.: US 6,799,732 B2
(45) Date of Patent: Oct. 5, 2004

(54) WATER SPRINKLER HEAD WITH INTEGRAL OFF-ON WATER FLOW CONTROL VALVE AND ADAPTIVE FITTINGS THEREFOR

(76) Inventor: Teodore Sirkin, 23262 Oxnard St., Woodland Hills, CA (US) 91364

( * ) Notice: Subject to any disclaimer, the term of this patent is extended or adjusted under 35 U.S.C. 154(b) by 133 days.

(21) Appl. No.: 10/027,335

(22) Filed: Dec. 19, 2001

(65) Prior Publication Data

US 2002/0088875 A1 Jul. 11, 2002

Related U.S. Application Data

(63) Continuation-in-part of application No. 09/755,793, filed on Jan. 5, 2001.

(51) Int. Cl.[7] ........................ A01G 25/06; B05B 15/06; B05B 15/10

(52) U.S. Cl. ....................... 239/205; 239/200; 239/201; 239/203; 239/204

(58) Field of Search ................................ 239/205, 569, 239/200, 201, 203, 204, 533.6, 580, 581.1, 581.2, 582.1; 137/625.47, 268, 559

(56) References Cited

U.S. PATENT DOCUMENTS

| | | | | |
|---|---|---|---|---|
| 581,358 A | | 4/1897 | Mayer | |
| 1,059,753 A | | 4/1913 | O'Brien et al. | |
| 1,127,683 A | | 2/1915 | Schwartz | |
| 1,272,263 A | | 7/1918 | Hooker | |
| 1,412,468 A | | 4/1922 | Jeanmaire | |
| 1,584,199 A | | 5/1926 | Stroebel | |
| 1,639,162 A | | 8/1927 | Brooks | |
| 2,285,689 A | | 6/1942 | Tulis | |
| 2,810,607 A | | 10/1957 | Hruby, Jr. | |
| 2,899,978 A | | 8/1959 | Hruby, Jr. | |
| 2,902,708 A | | 9/1959 | Riley | |
| 2,963,264 A | | 12/1960 | Hruby, Jr. | |
| 3,342,423 A | | 9/1967 | Hruby, Jr. et al. | |
| 3,517,886 A | | 6/1970 | Dyck | |
| 3,840,208 A | | 10/1974 | James | |
| 4,078,726 A | * | 3/1978 | Walto | 239/205 |
| 4,516,724 A | | 5/1985 | Hellman | |
| 4,813,605 A | | 3/1989 | Fuller | |
| 4,815,566 A | | 3/1989 | Caruso et al. | |
| 4,819,872 A | | 4/1989 | Rosenberg | |
| 4,842,198 A | * | 6/1989 | Chang | 239/200 |
| 5,360,172 A | | 11/1994 | Wang | |
| 5,526,845 A | | 6/1996 | Manos | |
| 5,558,113 A | | 9/1996 | Casteel et al. | |
| 5,771,930 A | * | 6/1998 | Visk | 137/625.47 |
| 5,836,517 A | | 11/1998 | Burns et al. | |
| 5,937,451 A | | 8/1999 | Mihara | |
| 5,944,051 A | * | 8/1999 | Johnson | 137/559 |
| 6,042,015 A | | 3/2000 | Eveleigh et al. | |
| 6,056,155 A | | 5/2000 | Byerly et al. | |
| 6,073,863 A | | 6/2000 | Wang | |
| 6,568,608 B2 | * | 5/2003 | Sirkin | 239/569 |

* cited by examiner

*Primary Examiner*—Davis Hwu
(74) *Attorney, Agent, or Firm*—Robert J. Schaap

(57) ABSTRACT

A sprinkler head assembly comprised of a base located at the upper end of a riser tube and which base carries an insert with an opening allowing for distribution of water. In accordance with the present invention, a control valve is located directly at the sprinkler head assembly. The control valve may be located in a stationary or shrub head which would be connected to a base or otherwise to a riser tube. The control valve could be located in a pop-up shaft, pop-up sprinkler head, or in a retrofit coupling or adapter located between a riser tube and sprinkler head. The control valve would rely upon a screw capable of being threadedly moved into a duct generally perpendicular thereto and which would have a diametral size somewhat larger than the duct. Moreover, the screw would be provided with an opening having a diameter approximately equal to that of the duct. The opening would be alignable with the duct in one position and when rotated would completely block the flow in another position. In this way, water flow to the sprinkler head assembly may be temporarily interrupted.

31 Claims, 7 Drawing Sheets

FIG. 5
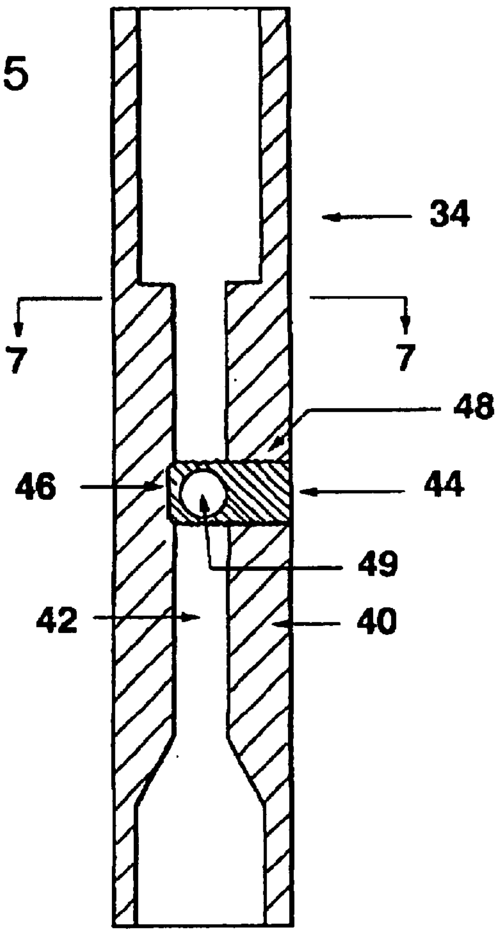
FIG. 9
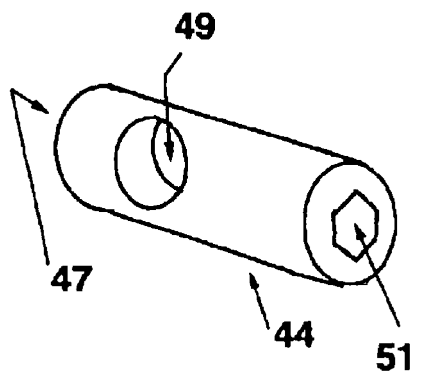
FIG. 7
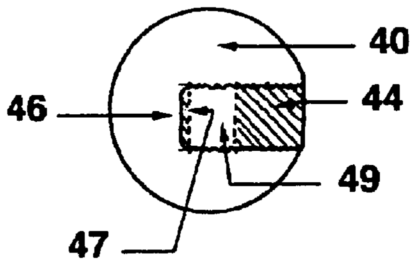
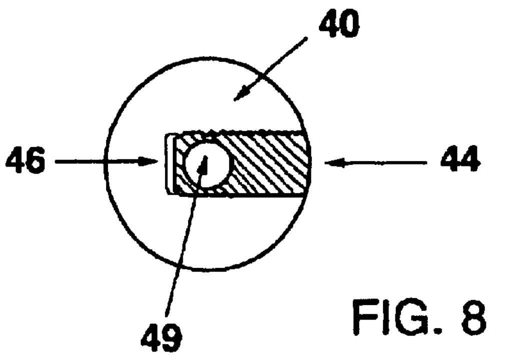
FIG. 8
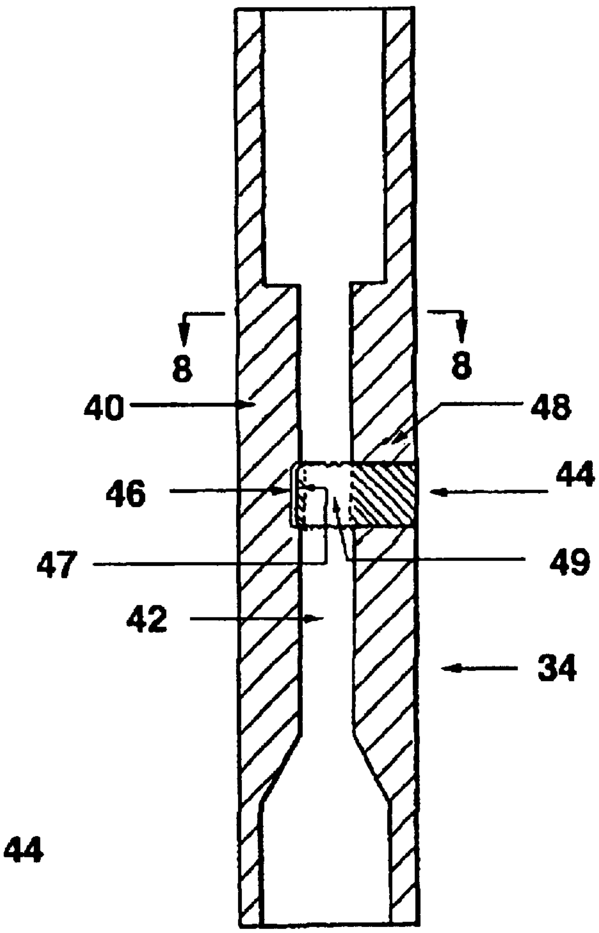
FIG. 6

WATER SPRINKLER HEAD WITH INTEGRAL OFF-ON WATER FLOW CONTROL VALVE AND ADAPTIVE FITTINGS THEREFOR

RELATED APPLICATION

This application is a continuation-in-part of my co-pending U.S. patent application Ser. No. 09/755,793, filed Jan. 5, 2001, for water sprinkler head with off-on water flow control for upstream of the water head insert.

BACKGROUND OF THE INVENTION

1. Field of the Invention

This invention relates in general to certain new and useful improvements in water sprinkler heads and, more particularly, to an improved sprinkler head which allows for turning water flow off and on directly at the sprinkler head to enable removal of the spray distributor, or disc, or so-called "insert" and, in some cases, the filtering screen underlying the insert.

2. Brief Description of Related Art

Lawn and garden sprinkler systems are common in many parts of the United States and in many other countries where the climate is hot and grass or other vegetation would readily perish if not watered either physically by one or more individuals or through the aid of an irrigation sprinkler system. Sprinkler systems are also more frequently used in periods in which the climate is particularly hot during certain periods of the year.

All irrigation sprinkler systems are connected to a water source, such as a municipal water supply, and contain relatively shallow underground pipes which extend under the ground surface and contain sprinkler heads projecting upwardly from these underground pipes in order to apply water to selected areas of a lawn or garden to be irrigated. Typically, in an average yard or lawn area, a sprinkler head would be designed to apply water to an area of, e.g. approximately four to fifteen feet in diameter, or more, depending upon the water pressure, the type of sprinkler head which is employed and the area which needs to be watered. As a rough average, approximately twelve to twenty-five sprinkler heads are used to irrigate an average yard or lawn, depending upon such factors as valve size, type of head employed, water pressure in the area, and the like.

The water sprinkler system normally employed uses a plurality of underground pipes, as aforesaid, and which are connected to a source of water, as aforesaid, and which is controlled by a master control valve at the head of the sprinkler system. However, if a master control valve is not actually used, the water meter effectively operates as that control valve.

The water which passes through the underground pipes and exits from the sprinkler heads is usually controlled by an anti-siphoning valve which is oftentimes controlled by a time clock and which components are frequently located at a point remote from the actual irrigated area. Moreover, each of the sprinkler valves would be governed by that master processor or master clock. The master clock and associated processor cause the opening of a valve, frequently referred to as a "RCV" (remote control valve) and which is also frequently located at a remote site and which allows for water flow through the various sprinkler heads. The RCV and the time clock are connected electrically. The same master clock and processor will cause a cessation of the water flow through the remote control valve after a predetermined period of time which is programmed into the clock or processor.

Water lines which carry water delivered from sources, such as the municipal water supply, or from wells, frequently carry small particles of dirt, pebbles, organic matter, pipe corrosion accumulations, installation tailings and other debris. This debris, left unchecked, quickly clogs up the orifices and nozzles of sprinkler heads rendering them unoperational. Even more debris enters subterranean sprinkler lines when an upstream head is broken, either by pedestrian or vehicular traffic, or during lawn maintenance operations, e.g. mowing.

Located at the top of the sprinkler head is that part commonly called an "insert" and which is generally screwed into the top of the sprinkler head. The insert is the part which contains the orifice from which the water exits. Inserts are constructed in various configurations, usually full inserts, or one-half or one-fourth inserts, bubblers, etc. The exact form of the insert is not critical in connection with the present invention, although access to that insert is important in the invention.

Hence, sprinkler heads and/or their inserts and nozzles must frequently be cleaned in order to enable a proper spray, that is, in a proper distribution of water, and water application to the ground surface. The problem, is so ubiquitous that virtually every commercially available plastic sprinkler head, both domestic and foreign, is constructed with a built-in screen, or contains a removable screen, in order to filter out debris so as to avoid clogging the orifices of the nozzles and inserts. This holds true for all types of sprinkler heads, including pop-up heads, stationary shrub heads, gear-driven rotor heads, large heads or small. (Only impact heads do not incorporate a screen.) However, inasmuch as the screen collects this debris contained in the delivered water, the screen necessarily requires periodic cleaning.

Insofar as removable screens are concerned, during maintenance operations, it is common for them to become lost or not be replaced due to oversight, which allows the debris to travel directly to the area of the orifices of the insert or nozzle. Even with screens in place, very small pieces of debris often get through the screen and bind together between the screen and the orifice to eventually clog up the orifice.

Sprinkler heads placed at ground level also suffer clogged orifices due to small stones and insects entering the orifices from the area surrounding the heads and then becoming stuck within.

The present method for changing inserts or cleaning sprinkler inserts or nozzles and flushing out the entire sprinkler head or pop-up shaft to ensure all debris is removed from the subterranean lines, requires turning off and on the water at the water source, which may be at the main valve or at the time clock (which electronically controls one or more valves.) For one person to clean just one sprinkler insert requires at least four separate trips back and forth to the valve or controller: one trip to remove the insert and the screen, another to flush out the sprinkler head or pop-up shaft, another to replace the insert and screen, and a final trip to shut off the valve after verifying that there is a proper spray and that the sprinkler is functioning as intended.

Another method of maintenance is to use two-person crews with one doing the cleaning, and the other operating the controller or opening and closing the valve. A third option, occasionally available, when the water volume and pressure is extremely low, is for the maintenance person to remove the insert, clean it out and—maybe—be able to replace it with the water running, but that person will become water saturated. This cannot be accomplished with pop-up shafts, but only on stationary shrub heads. Also, a great deal of water is wasted in this manner.

For purposes of cleaning the sprinkler insert or the underlying screen, or otherwise, replacing the insert, it would be more convenient m, open or close a valve in the field, directly at the location where the problem exists, rather than walk to the irrigation time clock or to the remote control valve, which could be a short distance, e.g., 20 feet, or a long distance away of 200 feet or more. In some cases, time clocks are installed inside of a locked building for which the landscaping is provided, thereby interfering with proper maintenance. As can easily be seen, a great deal of effort must be expended for cleaning out sprinkler heads where the valve or time clock for the project may be located at a somewhat remote point from the sprinkler head being serviced.

At present, there is nothing available in the sprinkler head industry that provides for turning the water supply on and off at the immediate location of the sprinkler head, upstream of the insert or nozzle, in a manner which provides for complete flushing of the water passageway duct after removal of the insert. Virtually all commercially available sprinkler heads are produced with removable inserts or nozzles.

One commercially available sprinkler head includes a valve mechanism for shutting down the water to the nozzle area so the nozzle can be changed. This latter design comprises a large rotor-driven head for covering large areas and does not appear easily adaptable to small garden and planter-type sprinkler heads and ordinary insert-types of pop-up heads and cannot be applied to retrofittable fittings. Although this particular mechanism cuts off the water only to the top section of the pop-up shaft, the built-in screen is necessarily located near the bottom of the pop-up shaft, a substantial distance from the nozzle area. This product does not allow for the valve mechanism to be anterior to or upstream to the screen, even if the screen were moved to a location close to the nozzle. Therefore, cleaning the screen area requires complete removal of the pop-up shaft assembly from the sprinkler housing. This activity requires accessing the clock or remote control valve to shut off the water to the entire system to allow servicing of any one head.

The aforesaid sprinkler head design also does not allow for thorough flushing of the water passageway duct anterior to the insert or nozzle area without an expansive and time-consuming process of removing the gear driven rotor assembly located in the passageway chamber. This action calls for removing the nozzle cavity and adjusting mechanism from the top section of the sprinkler head. However, the nozzle-receiving cavity and adjusting mechanism is machine-pressed into place and requires special tools for its removal.

Beyond the foregoing, there is no commercially available sprinkler head which allows for gradual shutting off the water to the insert or to an insert area which is valve-operated. Further, no sprinkler head or pop-up shaft provides for thorough, unobstructed controlled flushing of the water passageway duct anterior to the insert or nozzle.

Another presently available product has a stated purpose of immediately shutting off if a pop-up shaft breaks or is cut off, as for example, by a lawn mower. The fountain of water that usually results is avoided so the other sprinkler heads in the same system continue to function normally.

The mechanism that shuts off the water to the upper part of the pop-up shaft below where the screen and insert are located is a reverse plunger containing small holes at its perimeter through which water passes from the riser pipe. When debris clogs up those small holes, removal of the entire pop-up shaft becomes necessary to flush out the pop-up shaft. Naturally, this requires shutting down the water supply to the entire system. This product also requires all of the components of the insert assembly to be in place to depress the plunger so the sprinkler head can be returned to operation. This type of construction is difficult to use with ordinary stationary shrub-type sprinkler heads.

Generally speaking, there are only two types of sprinkler heads that are employed in most irrigation systems, especially in the majority of residential irrigation systems installed for average-sized homes and average-sized apartment dwellings. The same holds true for neighborhood shopping centers, small to medium-sized industrial buildings, perimeter or parking lot plantings for schools, large shopping centers or complexes and throughout many parkway areas in which lawns are planted between the street and the sidewalk. Sprinkler heads that appear in lawns are almost always pop-up type sprinklers so that they do not interfere with mowing of the lawn or other cleaning of the lawn. The second type of head which is used and, particularly, in shrubbery and so-called ground cover areas, is the stationary type known as a "shrub head" and which usually extends about an inch to as much as twelve inches, usually or four to six inches, above a ground surface.

When it is necessary to clean or repair the sprinkler head, or any part thereof, e.g., the screen below the head, it is almost always necessary to cut-off water flow to that head. Otherwise, when the insert is removed from the head, water will exit usually in a substantial volume, since a removed insert presents the point of least resistance to water flow under pressure throughout the entire irrigation system.

In order to remove the water emitting nozzle or insert from the sprinkler head, it is necessary to cut-off the flow of water to the sprinkler head. Upon determining that the area near a sprinkler head is not receiving sufficient water, the gardener or maintenance personnel must turn on the RCV, either at the time clock or manually open the RCV and then return to the problem area to observe the water that is actually being emitted from the various sprinkler heads in a certain locale. At that point, the gardener or maintenance personnel must then walk back to the master valve or to the RCV or to the controller, turn off the water valve, controller or RCV, and walk back to the sprinkler head for removing the sprinkler emitting disc or so-called "insert" from the sprinkler head and allow for cleaning thereof.

Prior to insertion of the water emitting disc back into the sprinkler head, it is necessary to flush water from the sprinkler head itself. Consequently, and in order to perform the flushing operation, the gardener or irrigation personnel must then walk back to the master valve or controller, turn on the master valve or controller, and allow for flushing for several seconds or minutes. Naturally, the same personnel must be present at the flushing of the water line during the flushing operation. Thereafter, the same maintenance personnel then walks back to the master valve or controller, turns off the master valve and again returns to the particular sprinkler head which is being cleaned in order to insert the spray emitting disc. Following this, the same maintenance personnel must walk back to the master valve or controller in order to turn on the master valve, or RCV or controller and return to the head to be sure that it is now functioning properly and make any necessary adjustments to the water flow and/or direction of the spray.

It can be observed that the amount of the personnel hours lost in the pure physical act of walking back and forth can be quite substantial and necessarily adds to the cost of an irrigation bill from the maintenance personnel or the like. Moreover, it consumes a substantial amount of effort and, in some cases, frequently results in malfunctioning sprinkler heads not being cleaned and repaired as frequently as they would otherwise be repaired or cleaned.

In addition to the foregoing, pop-up sprinkler heads are much more complicated in their construction than are the so-called “shrub heads”. The pop-up heads entail moving parts and which require water pressure to force the heads upwardly over the ground surface in order to properly emit the water spray to the ground surface. Other than the very top of the head, pop-up heads are completely buried in the ground making them more difficult to service. However, for the proper operation of the pop-up heads, the dirt and debris must again be frequently cleaned from the spray emitting orifice or the screen therebeneath.

Almost all commercially available sprinkler heads have a flow control feature. This flow control feature resides in the form of a small screw located at the very top of the insert which can regulate the flow of water outwardly of the head. By tightening the screw down to the point where there is no water flow, cessation of the water flow has effectively been achieved. However, in each of these cases, one could not remove the head or the insert of the head since there is no upstream point in proximity to the sprinkler head to cut-off water flow for a temporary period.

There are numerous sprinkler heads reported in the literature and available in the prior art. For example, U.S. Pat. No. 2,360,203 to Fox, U.S. Pat. No. 1,639,162 to Brooks, U.S. Pat. No. 1,681,719 to Baldwin, and U.S. Pat. No. 3,263,930 to Friedmann, et al, disclose various types of pop-up heads. Each of these sprinklers may contain a feature to control the spray and, to some extent, operate as a type of flow control. However, none of these sprinkler head types include any means to stop water flow to the insert at a nearby point upstream from the sprinkler head insert. In addition, U.S. Pat. No. 1,078,543 to Hadden discloses a sprinkler head having a type of head position adjustment using a set screw. However, and here again, there is no means to cut-off water flow to the head at a point adjacent to and upstream of the sprinkler head insert.

U.S. Pat. No. 4,282,508 to Roberts includes an internal adjustment screw, although again it would not permit opening and closing of the sprinkler head at a point upstream of the sprinkler head in order to permit removal of the insert without turning off water at a remote source. U.S. Pat. No. 4,813,605 to Frank Fuller also discloses a system including a threaded valve stem capable of being threaded into a fluid duct. However, in the Fuller patent, the screw serves as a restrictor and only balances the amount of water which exits the nozzle of the head. This type of mechanism would be useful where a series of heads are connected in a series to a sprinkler system.

Notwithstanding, the device in the Fuller patent would not function to work as an off-on valve for temporarily allowing servicing of a sprinkler head.

U.S. Pat. No. 3,342,423 to Hruby discloses a flow regulating discharge valve which is designed to provide no flow and to allow flow at a maximum flow condition. The head, however, is a one piece sprinkler head such that there could be no facility for cleaning the head or changing any part of the head. Hruby, however, would only allow for placement of a filtering screen below the regulatory valve which would then require shutting down the entire system in order to enable cleaning of the screen.

It would therefore be desirable to provide some means to shut off water flow and again turn on water flow to a sprinkler head through manual actuation at the sprinkler head in a position such that an insert at the sprinkler head may be removed and/or the sprinkler head otherwise replaced without the need of walking to a remote site or operating in conjunction with personnel at a remote site in order to clean or repair that sprinkler head or its underlying screen. In other words, it would be desirable to be able to control the flow of water to a sprinkler head from a point upstream of the sprinkler head, but in very close proximity to the sprinkler head.

It would also be desirable to provide a means for shutting off water flow and again re-initiating water flow merely by turning a screw on the side of the sprinkler head assembly one-quarter of a turn in order to achieve a gradual change between maximum flow and no-flow conditions.

OBJECTS OF THE INVENTION

It is, therefore, one of the primary objects of the present invention to provide a sprinkler head which allows for gradual cessation and re-initiation of water flow to a sprinkler head from a point upstream of the insert of the sprinkler head, but yet in close proximity to the insert of the sprinkler head.

It is another object of the present invention to provide a unique water sprinkler head of the type stated which allows for cleaning, replacement and/or repair of the sprinkler head without walking to a remote site from the sprinkler head or operating in conjunction with other personnel at a remote site to control water flow to that sprinkler head.

It is a further object of the present invention to provide a unique water sprinkler head of the type stated which includes an internal valve component installed in the head which would allow personnel to gradually cut off water flow to and re-allow water flow to that sprinkler head by simple manual actuation at the sprinkler head.

It is an additional object of the present invention to provide a unique water sprinkler head of the type stated which allows for cleaning and/or repair of a sprinkler head both efficiently and conveniently without the need for extra or other types of tools and which resides in the feature of a simple valve construction integrated into the sprinkler head.

It is a salient object of the present invention to provide a unique water sprinkler head of the type stated which can be constructed at a relatively low cost and which is highly efficient and simple in operation.

It is yet another object of the present invention to provide a method of turning water flow off and re-initiating water flow to a sprinkler head from a point in close proximity to a sprinkler head in order to allow for repair, replacement and/or maintenance of the sprinkler head without interrupting water flow to an entire sprinkler system.

It is still another object of the present invention to provide a method of using a retrofit device in existing sprinkler systems to employ a modified sprinkler fitting upstream of the sprinkler head and which would incorporate an internal valve component which allows personnel to cut off water flow and to re-establish water flow to the sprinkler by simple manual actuation. Moreover, this actuation occurs directly at the sprinkler head assembly at a point just below the sprinkler head itself.

It is another salient object of the present invention to provide a sprinkler head assembly in which water flow can be gradually turned from a maximum flow condition to a no-flow condition merely by turning a screw head through an arc of less than 360° and typically an arc of 90°.

With the above and other objects in view, my invention resides in the novel features of form, construction, arrangement and combination of parts and components presently described and pointed out in the claims.

SUMMARY OF THE INVENTION

The present invention resides in a novel sprinkler head which allows for gradual shutting off water to the sprinkler head without shutting down the water at an origination point in an entire sprinkler system or segment of that sprinkler system. The sprinkler head is constructed so that the water flow may be cut-off and reinitiated upstream of the water exit location in that sprinkler head and which allows for repair, replacement and/or cleaning of the sprinkler head.

In one embodiment, the sprinkler head assembly may constitute a shrub or stationary head connected to the upper end of the riser tube. In this embodiment, the control valve would be preferably located in the body of the base of the stationary sprinkler head. In another embodiment, the sprinkler head assembly constitutes a pop-up sprinkler head and the control valve would be located in the pop-up shaft forming part of that sprinkler head. In still another embodiment of the invention, a retrofitable coupling or adapter may be provided and which would be located between a riser tube and a sprinkler head forming part of that assembly. In this case, the adaptive coupling would include the control valve. Another retrofit embodiment would permit incorporation of the control valve into a vertical riser TUBE to which the sprinkler head is affixed. In each case, water flow to the sprinkler head assembly may be temporarily interrupted to allow cleaning and repair or replacement of the sprinkler head from a point upstream of the insert, but yet in close proximity to that sprinkler head assembly.

In one of the important facets of the present invention, the control valve or so-called "valve component" or "valve mechanism", which is located directly at the sprinkler head is preferably integral with the sprinkler head. In broader terms, it is a component part of the sprinkler head assembly. In addition, this component may adopt the form of an adaptive fitting which could be located between the actual head and the riser tube. If incorporated into an existing sprinkler head the adaptive fitting would become a retrofit device for controlling the water flow directly to the sprinkler head.

In substance, there are essentially four ways in which a control valve component can become integral with the sprinkler head assembly and that is by installation in a riser tube or otherwise installation in the body of the sprinkler head. Thirdly, the control valve component could be located in an adaptive fitting which is disposed between the sprinkler head and the riser tube. Finally, the control valve component could be located in the pop-up shaft forming part of the pop-up sprinkler head.

In the case of the shrub head, that is one which extends above a ground surface by a limited distance and is fixed in that position, a small gate valve could be installed into the riser pipe and in a position upstream of that sprinkler head. In this way, upon shutting off the gate valve below the sprinkler head, cleaning of the screen or the insert part of the head can be accomplished readily and simply. This gate valve could be closed to remove the insert and then opened a small amount so as to flush out water from the riser and the head and then again closed off right at the sprinkler head so that the insert could be reinstalled without water saturation of maintenance personnel.

The problem with the above-identified approach is that it would be more costly to both install and to provide for a gate valve installation with the sprinkler head. Moreover, they would be unsightly and even invite vandalism. In addition, these gate valves would often be in an underground location and unserviceable as a result of corrosion, consequently, use of a gate valve would not be desirable.

The present invention thereby provides a device which can be located as a part of the riser piping immediately upstream of a shrub sprinkler head or a part of adaptive fitting as part of a retrofit application, or part of the shrub sprinkler head itself, or located in the pop-up shaft of a pop-up sprinkler. For the stationary sprinkler heads, that is, the so-called shrub sprinkler heads, the device can be configured both for new sprinkler heads and in a retrofit arrangement, as aforesaid. In the case of a new riser sprinkler head construction, a small off/on control valve can be installed in a position within the sprinkler head upstream to the actual insert of the sprinkler head.

The small valve component would effectively cut-off the water flow prior to the insert so that cleaning and flushing may be accomplished easily and with little mechanical involvement and, certainly, without the need for travel back and forth to the water source. The small valve arrangement is in the nature of a small off/on security-type control valve component installed into an area of the base of the sprinkler head, preferably having a reduced bore diameter, coaxial with the riser pipe.

In a second embodiment of the invention in which the small valve construction may be employed as a retrofit arrangement in a stationary sprinkler head, an adaptive fitting with a small stub pipe or a modified connector coupling having an internal bore coaxial with that of the riser pipe would be installed at the riser pipe, or the control valve may be installed into the riser tube itself. In each case, it would be in a position upstream of the sprinkler head. In either case, this would allow for off/on control of water flow to the sprinkler head at the head or area needing service.

In the case of a pop-up sprinkler head, the same off/on valve arrangement would be incorporated into the pop-up shaft. The relatively thin wall cross-sectional thickness of the pop-up shaft will have to be increased, as in the previous embodiments of the invention. This will result in a reduced bore diameter in a region below the screen in order to accommodate an off/on control valve component.

In the present invention, the sprinkler head, including all of the components, such as the body, the screen and the insert, are referred to as a sprinkler head assembly. In the case of the pop-up sprinkler head, the pop-up shaft is part of this assembly. In many cases, the riser tube is also deemed to be part of the sprinkler head assembly. In all cases, and in this respect, the off/on control valve component, which is integral with the sprinkler head assembly, would be incorporated in the pop-up shaft, the riser tube or the body of the sprinkler head or otherwise even a coupling fitted between the riser tube and the sprinkler head.

In all embodiments of the invention, the off-on valve component can also function as a type of regulatory control valve frequently referred to ad a "flow control valve" or "flow controller". However, its primary purpose is to cut-off water flow through the sprinkler head for purposes of enabling maintenance or repair of the sprinkler head without shutting off the entire sprinkler system. Moreover, in each such embodiment of the invention, the off-on control valve component would normally cut off the major portion of the water flow. If there is a minor flow of water passing through the off-on control valve, that is not a significant factor in the sprinkler head being repaired or maintained. Consequently, water flow does not have to be entirely shut off although the substantial volume of the water does have to be temporarily abated.

The off-on control valve component relies upon a screw which is threaded into the duct of the sprinkler head assembly and generally in a position perpendicular to the central axis of the duct. In this way, the valve stem would extend perpendicularly into the axis of the duct. The valve stem is provided with an opening perpendicular to the axis of the valve stem and which can be axially aligned with the duct of the sprinkler head assembly. When in a first or closed position, the opening in the valve stem is located perpendicular to the axis of the duct and is out of fluid communication with the duct such that water flow is stopped. When the valve stem is turned 90°, the opening in the valve stem becomes aligned with the duct and water passes through the opening in the valve stem and through the duct.

In contrast to the off/on valve mechanism described in the aforesaid co-pending patent application, the valve stem or valve plug of this off/on valve mechanism only requires a relatively small turn as for example, one-fourth of a full revolution. In the aforementioned co-pending patent application, water flow was allowed when the valve stem was threaded out of the axial water carrying duct passing through the sprinkler head assembly. Thus, for full flow, it was necessary to unscrew the valve plug to the point where it was moved beyond the valve duct or at least to a point of one-half the diameter of the duct. For purposes of stopping flow, the valve stem or plug was turned in the opposite direction until an end of the valve abutted against a recess formed in the wall of the sprinkler head assembly adjacent the fluid duct.

In contrast to the prior application, there is no need to completely unscrew or remove the valve stem from the fluid duct in the present invention. It is only necessary to turn the valve stem about one-fourth of a full 360 revolution, from a position where the screw completely blocks fluid flow to a position where an opening in the valve stem becomes aligned with the duct, thereby allowing fluid flow.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 1:
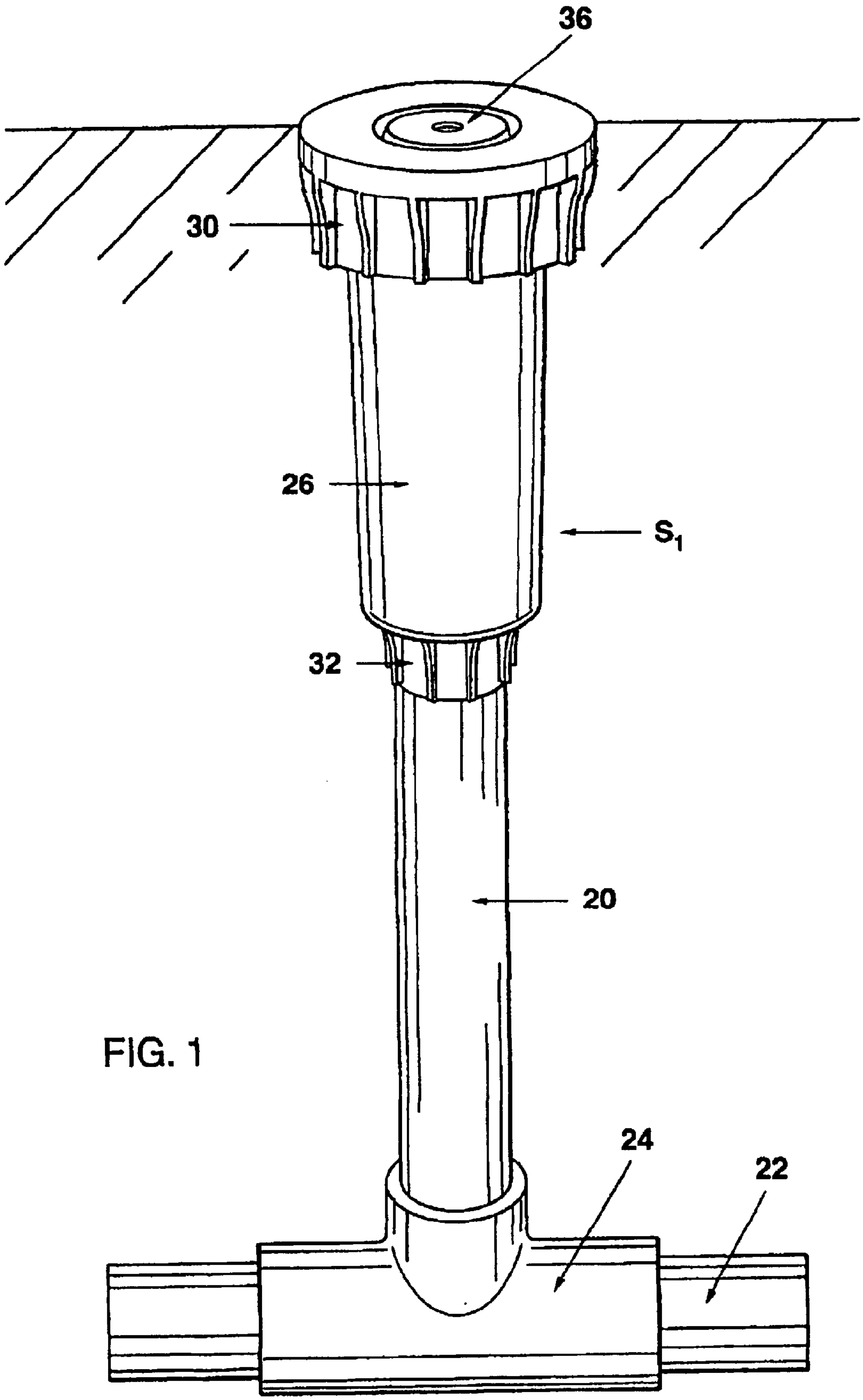
Figure 2:
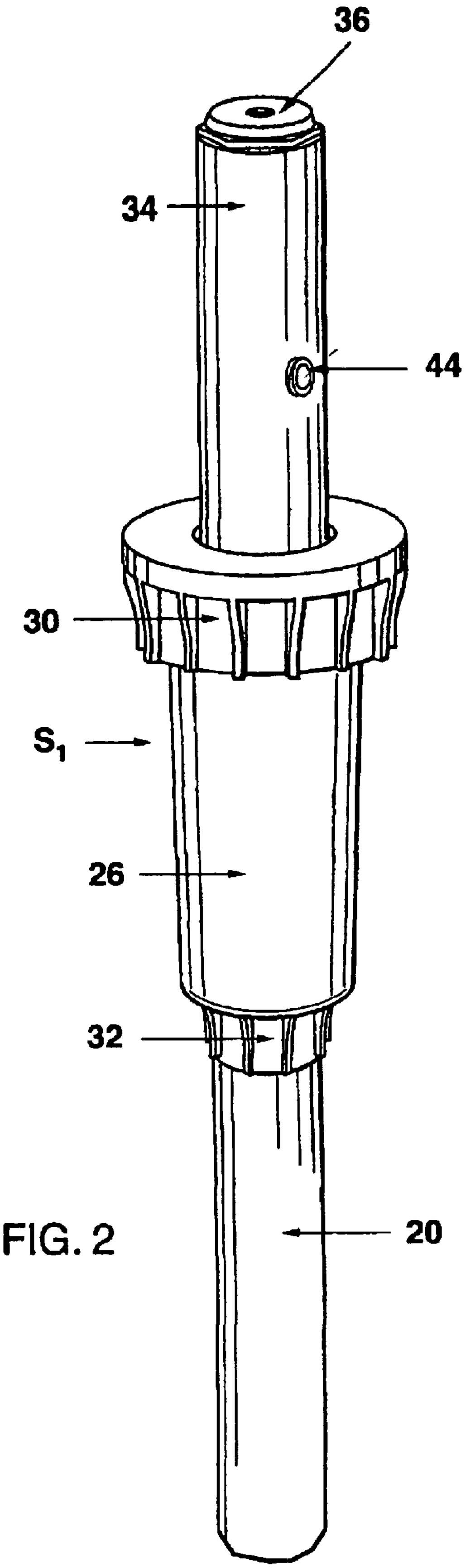
Figure 3:
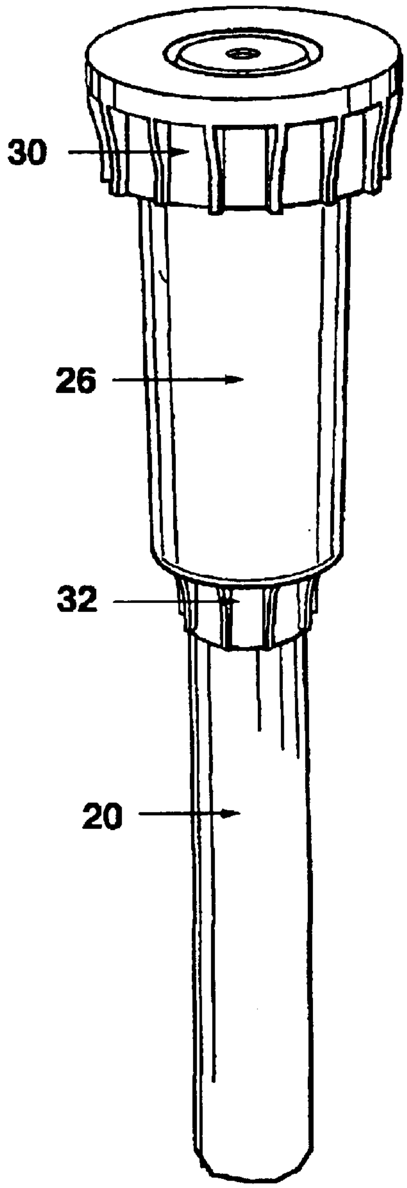
Figure 4:
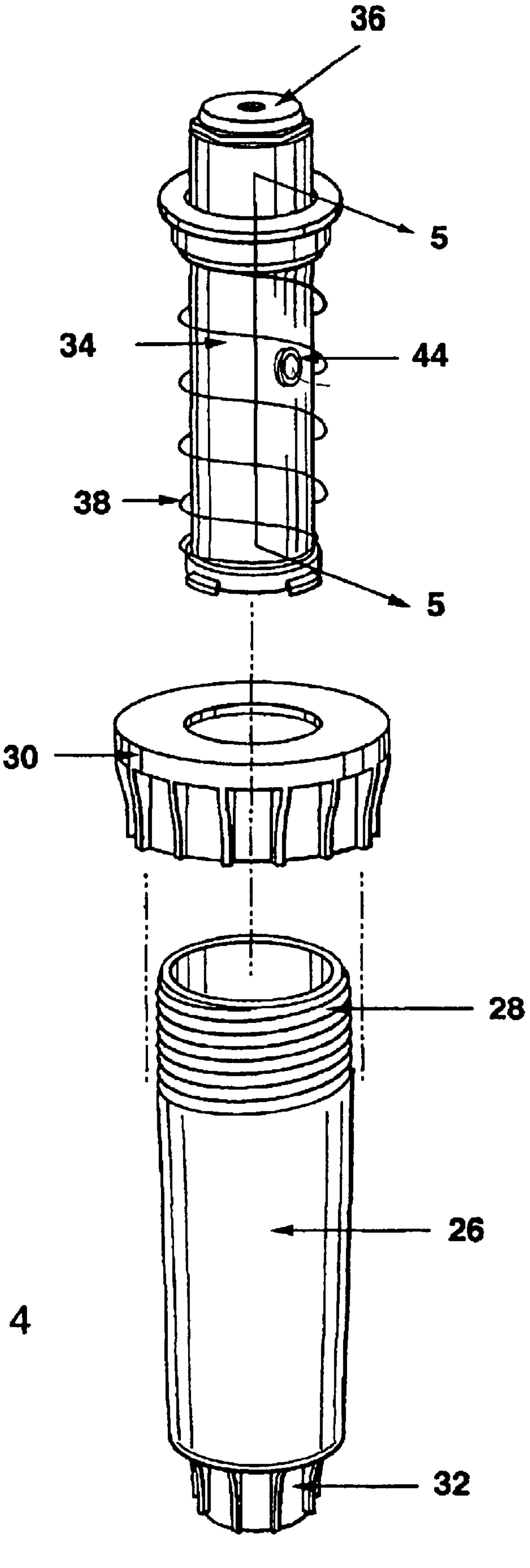
Figure 10:
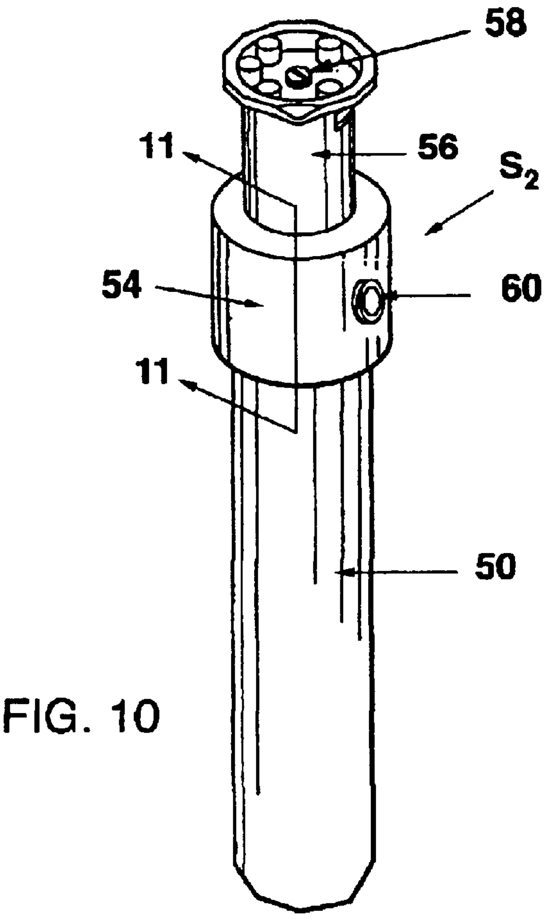
Figure 11:
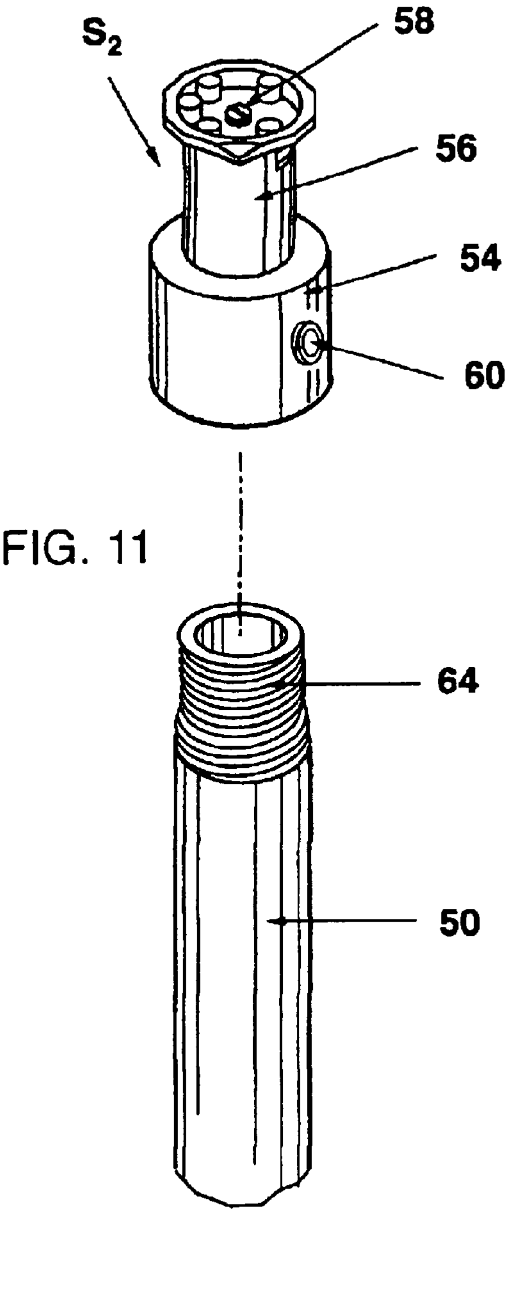
Figure 12:
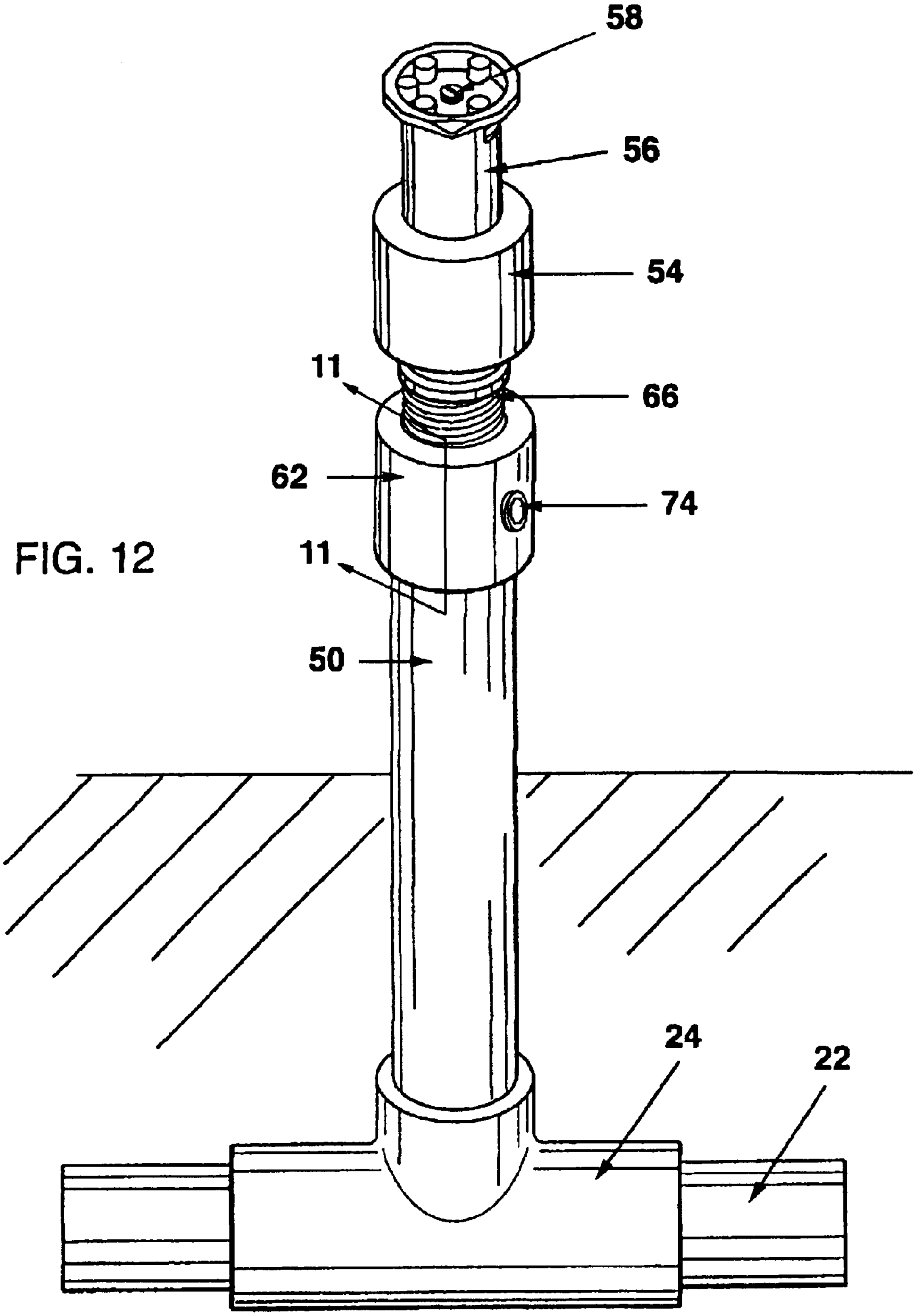
Figure 13A:
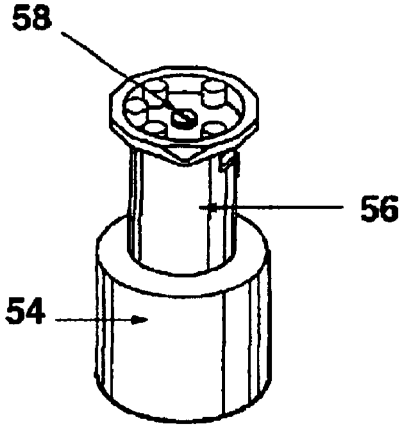
Figure 13B:
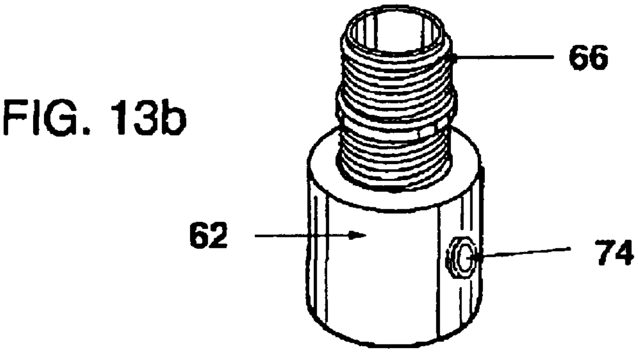
Figure 13C:
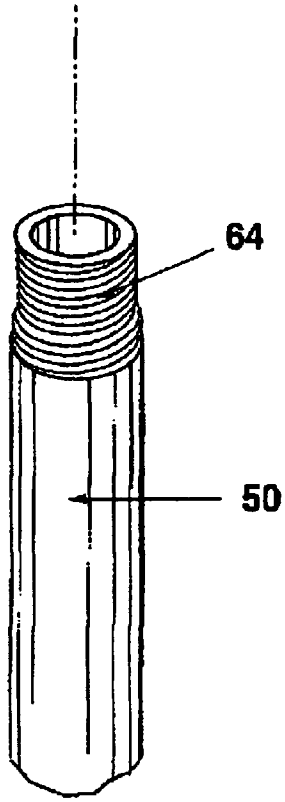
Figure 14:
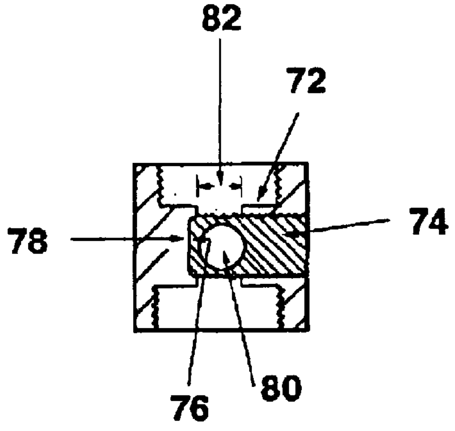
Figure 15:
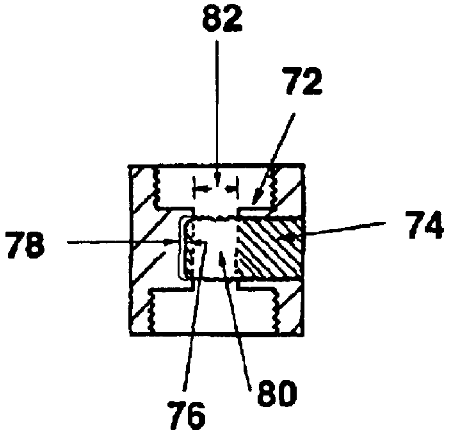

Having thus described the invention in general terms, reference will now be made to the accompanying drawings in which:

FIG. 1 is a perspective view of a pop-up sprinkler head constructed in accordance with, or having a control valve arrangement incorporated therein, in accordance with the present invention;

FIG. 2 is a perspective view of a typical sprinkler head of FIG. 1 with the pop-up shaft extended above the cap of the sprinkler head;

FIG. 3 is a perspective view, similar to FIG. 1, and showing retraction of the pop-up shaft back into the sprinkler head;

FIG. 4 is an exploded perspective view showing an arrangement of certain of the components in the pop-up sprinkler head in accordance with the present invention;

FIG. 5 is a vertical sectional view showing a portion of an off/on valve in the sprinkler head of FIGS. 1–4, essentially taken through the pop-up shaft thereof at line 5—5 thereof, and showing the off/on valve in a closed position;

FIG. 6 is a vertical sectional view, similar to FIG. 5, and showing the valve in a valve opened position;

FIG. 7 is a sectional view taken along line 7—7 of FIG. 5 when the off/on valve is in the closed position;

FIG. 8 is a sectional view taken along line 8—8 of FIG. 6 when the off/on valve is in the opened position;

FIG. 9 is a perspective view of a valve plug or stem forming part of the off/on valve in the present invention;

FIG. 10 is a perspective view of a shrub head provided with the valve component of the present invention and showing the shrub head affixed to a riser pipe extending into a portion of a ground surface;

FIG. 11 is an exploded perspective view showing an arrangement of a shrub head having the valve assembly of the present invention incorporated in the body thereof with respect to a riser pipe;

FIG. 12 is a perspective view showing the incorporation of a retrofit coupling onto a riser pipe and which is, in turn, provided with a shrub head in accordance with the present invention;

FIG. 13 is an exploded perspective view of the unassembled components in which an adaptive fitting containing the valve assembly of the invention is interposed between a shrub head and a riser pipe; and FIG. 14 is a sectional view taken through a portion of the off/on valve assembly of the present invention, such as in arrangements of FIGS. 10–13 taken along line 11—11 of FIG. 10 and showing the valve assembly in the closed position; and FIG. 15 is a sectional view, similar to FIG. 14, and showing the off/on valve assembly of the invention in the opened position.

DETAILED DESCRIPTION OF A PREFERRED EMBODIMENT

Referring now in more detail and by reference characters to the drawings, which illustrate preferred embodiments of the present invention, FIG. 1 illustrates a pop-up sprinkler head $S_1$ constructed in accordance with and embodying the present invention and shown as being connected to the upper end of a riser pipe 20 and which is, in turn, supplied with water from the main subterranean irrigation line 22. Typically, the riser pipe 20 is connected to the irrigation line 22 through a T-fitting 24.

The pop-up sprinkler head $S_1$ is provided with an outer body or so-called “housing” 26 threadedly secured to the upper end of the riser pipe 20 and the open end of the body 26 is provided with a threaded section 28 for threadedly receiving a removable cap 30. The lower end of the body 26 is provided with an integral internally threaded fitting 32, the latter of which allows for threaded attachment to the upper portion of the riser pipe 20 as aforesaid.

Provided for vertically shiftable disposition within the body 26 is a pop-up shaft or so-called pop-up tube 34 (FIG. 2) and which is hollow in construction, as hereinafter described. At its upper end, the pop-up shaft 34 is provided with a removable threadedly secured insert 36. In all constructions, the body 26 and the cap 30, as well as the pop-up shaft 34, are of plastic construction. The insert 36 is frequently formed from a suitable metal or plastic, although any material of construction could be employed for this purpose.

In a conventional sprinkler, the pop-up shaft 34 would normally be of thin wall construction and would have an internal bore of generally consistent diameter throughout the length thereof. In that conventional sprinkler head the pop-up shaft is biased back into the body by a spring extending about the pop-up shaft. The same construction holds true herein. The pop-up shaft 34 is generally biased back into a retracted position with the body 26 by means of a spring 38 coiled about the pop-up shaft 34, as shown in FIG. 4.

Due to the fact that the pop-up shaft 34 is generally provided with a thin wall construction, it is necessary in accordance with the present invention to modify the pop-up shaft with a thickened wall section, as shown in FIGS. 5 and 6. This pop-up shaft 34 has a section 40 midway between its upper and lower ends which is of increased wall thickness and, hence, presents an internal bore 42 of somewhat reduced diameter. Located within the thickened wall section 40 is a valve plug, or so-called “valve stem” 44, and which is capable of being threaded into and abutted against a recessed area 46 located within the thickened wall section 40. The valve stem 44 is provided with a head-end 47 which may be somewhat arcuately shaped, or even trapezoidally shaped but tightly engages with the corresponding end 46 of the recess so that it fits snugly within and abuts against recessed area 46. This valve plug 44 is threadedly fitted within a threaded section 48 formed in the thickened wall section 40, as best shown in FIG. 6.

When the valve plug 44 is tightened against the recess 46, an opening 49 in the valve plug is located so that the axis of the opening 49 extends perpendicularly to the axis of the duct or bore 42. When the valve plug 44 is in this position, as shown in FIGS. 5 and 7, it can be seen that the opening is located out of alignment with the duct 42 and hence no fluid flow will occur. However, when the valve plug 44 is rotated 90°, about its axis, the opening 49 will be in alignment with the duct 42 and hence fluid flow will occur. In other words, when the valve plug 44 is rotated to its opened position, as shown in FIGS. 6 and 8, water flow from the lower end of the shaft 34 and through the upper end to the insert 36 is allowed.

The valve plug 44 is preferably conveniently provided with an elongate slot, or other tool receiving recess, on its exterior surface, as shown in FIG. 2, in order to allow for adjustment through a simple screw driver or the like. A socket 51 is shown in one end of the valve plug 44, in FIG. 9, for receiving a tool having that socket configuration However, any means for turning the valve plug may be employed in accordance with the present invention.

It can also be observed that when the valve plug 44 is rotated, it will not only rotate the opening 49 into alignment with or, out of alignment with the duct 42, but it will actually cause a slight axial shifting movement thereof. In this case, if the valve plug 44 is turned in a counter-clockwise position, reference being made to FIG. 9, the valve plug 44 will be displaced slightly to the right, reference being made to FIGS. 6 and 8. However, inasmuch as the duct 42 is in alignment with the opening 49, water flow will be permitted in any event and a slight amount of water flowing around the end 47 will not create any malfunction of the valve arrangement.

The wall thickness of the pop-up shaft 34 is increased, such that the water passageway 42 is roughly 3/16 to 1/4 inch in diameter. This modification increases the amount of plastic in order to allow for installation of the valve stem. In essentially all embodiments, it will be necessary to increase wall thickness in order to accommodate the small control valve of the present invention. One portion of the sprinkler head body almost necessarily has to be thickened so as to allow for the use of a valve plug to control water flow. Clearly, the same holds true when the small end valve is located in a riser tube of modified design. Even in the case of an adaptive fitting, which may also be in the nature of a coupling, it is also necessary to provide a thickened wall section to allow receipt of a shiftable plunger for control of water flow (FIGS. 14 and 15).

In essence, the valve plug or valve stem 44 can easily adopt the form of a 1/4 to 5/16 inch diameter set screw. The diameter of the valve plug can vary. However, in one embodiment, the valve plug has a 1/4 to 5/16 inch diameter. In another embodiment, the diameter ranges from are 3/8 and 1/2 inch. However, there is no criticality to these diameter ranges, except that the interior surface must be capable of having a hole drilled or otherwise formed therein. Moreover, it must have a diameter not less than that of the duct. When the valve stem 44 is torqued against the inner end of the recess, the opening will be rotated to close off the passageway. In pop-up heads, the outer end of the set screw or valve plug is flush with or recessed slightly below the outer surface of the pop-up shaft when in the opened or closed position. The inside end 47 of the valve plug 44 is rounded so as to fit snugly within the recess 46, shown in the closed position, as shown in FIGS. 5 and 7. In this way, this type of construction precludes water leaking past the plug 44 or out from the sides of the valve arrangement. The recess 46 actually precludes water moving up the duct 42 when in the off position.

FIGS. 10 and 12 illustrate the arrangement of the valve assembly of the present invention incorporated in the body of a stationary shrub head. FIGS. 12 and 13 illustrate a retrofit arrangement, on an otherwise conventional embodiment of a shrub head. In the case of a retrofit arrangement, whether with an above ground pop-up sprinkler head or impact head with a shrub head, a coupling or some other form of adaptive fitting the retrofit arrangement is interposed between the sprinkler head itself and the riser pipe. In like manner, and specifically in the case of the pop-up sprinkler head, a substitute pop-up shaft or tube can be replaced for that existing in the conventional pop-up sprinkler head. This can be accomplished merely by removal of the cap 30, installation of the new pop-up shaft 34, and re-threading the valve cap 30 back into its position, as shown in FIG. 1.

FIGS. 10 and 11 illustrate a valve arrangement incorporated into the body of a shrub sprinkler head, as aforesaid. Thus, and referring, in particular, to FIGS. 10 and 11, it can be seen there is a shrub head $S_2$ having a body 54 and an upstanding insert 56. The insert is provided with a screw 58 at the top portion thereof. Moreover, the insert is generally threaded into the upper end of the body 54.

In this particular embodiment, there is provided a valve arrangement 60 which is incorporated into the body 54. This valve arrangement would be substantially similar to and operate in a manner substantially the same as that valve arrangement shown in FIGS. 5 and 6 and used in a pop-up tube. In FIG. 10, it can be observed that the base 54 of the sprinkler head $S_2$ is actually threaded onto the upper end of a riser pipe 50 and the latter of which would be connected to a T-fitting or an elbow on a subterranean pipe for delivery of water.

In this embodiment, it can be observed that the sprinkler head $S_2$, which is frequently referred to as a “shrub head”, is of a stationary type, that is, it does not include a pop-up shaft, but rather, contains no moving parts and is located a fixed distance above the ground surface.

The adjustment screw 58, as used in the prior art, is not necessary and the present design eliminates the need for that adjustment screw which is used for flow control. The construction of this invention provides for complete flow control and at the same time solves some of the more difficult problems with the prior art flow-control mechanisms. Flow control in the present application is a natural by-product and is made easier and with less problems.

FIGS. 12 and 13 illustrate an embodiment of the invention in which there is a coupling or adaptive fitting located between a riser pipe, such as the riser pipe 50, and a sprinkler head, such as a shrub type sprinkler head. In the previously described embodiments, the valve assembly forming part of the present invention was actually incorporated in the sprinkler head as an integral part thereof and would normally be provided in newly constructed sprinkler heads as a replacement. This is particularly true in the case of the shrub head in which the body of the shrub head is provided with the valve arrangement. In the case of the pop-up sprinkler head, the sprinkler head again could be provided in new construction with a modified form of pop-up shaft therein.

In the embodiment of the invention which uses a coupling or adaptive fitting, as shown in FIGS. 12 and 13, a retrofit coupling 62 is provided and is threadedly secured to the upper end 64 of a riser pipe 50. The coupling would be provided with an internally threaded lower end (not shown) for threaded securement to the upper end of the riser pipe. In like manner, the upper end of the retrofit coupling 62 would be internally threaded to receive a stub pipe 66 or in the case of an adaptive fitting would be externally threaded to receive the base 54. In this case, the coupling 62 or adapter is also provided with the valve arrangement of the present invention and which is also hereinafter described in more detail. This valve arrangement is also provided with a valve plug 74, similar to the plug 60, and which is again hereinafter described in more detail.

Secured to the upper end of the stub pipe 66 is a shrub head, such as that shrub head illustrated in FIG. 13, and which is similarly comprised of a body 54 and an insert 56 having removable upper screen and adjustment screw 58 therewith.

FIG. 13 illustrates the components forming part of the retrofit assembly of FIG. 12 in an exploded view. Thus, and for this purpose, it can be seen that the sprinkler head having the body 54 is actually of a conventional design. In like manner, the riser pipe 50 is similarly of a conventional design and includes an upper threaded section 64 adapted to receive the internally threaded socket of the coupling 62 or adaptive fitting. Moreover, the stub pipe 66 will thereupon receive the sprinkler head having the base 54 thereof. It should also be understood in accordance with the present invention that the valve arrangement could be actually incorporated in the riser pipe 50 itself, in which case a conventional sprinkler head construction could be used while obtaining all of the benefits of the present invention.

In all embodiments, the sprinkler head, and the adaptive fittings, the modified riser pipes, etc., are highly effective, in that they permit cut-off and re-initiation of water flow to sprinkling apparatus well below the insert or nozzle area which allows maintenance personnel to clean the sprinkler head nozzle area or replace the nozzle and to flush out the entire sprinkler head without the need of operating in conjunction with another party or without traveling to a remote site for control of water flow. In fact, when the valve mechanism is open there is a completely unobstructed passageway throughout the duct to the sprinkler head nozzle area.

Further, the coupling, adapter or modified riser pipe all embodying the valve plug in a retrofit application provide a means to remove the entire sprinkler head, including, for example, the large above-ground impact and rotor-type sprinkler heads commonly found in projects in which the sprinkler head covers large areas. With the above retrofit embodiment of the valve mechanism installed below large sprinkler devices, the water flow can easily be shut off only to a problem sprinkler head for servicing and/or replacement in the same manner as described herein, without leaving the immediate repair site or employing additional service personnel. This is especially advantageous for the maintenance of hillside planting irrigation systems. Where the irrigation controllers are a substantial distance from the areas to be irrigated. They are usually out of range for remote control devices.

In connection with the operation of the actual off/on valve, the coupling or adapter 62 having the valve arrangement is more fully illustrated in FIGS. 14 and 15 of the drawings and comprises a slightly thickened section 72 in the wall construction of the element receiving the valve plug, such as the valve plug 74. Thus, this valve plug 74 is similar in operation and construction to the valve stem 44. Again, the valve plug 74 has an inner end 76 designed to fit against and slightly within a recess 78 for tightly closing off water flow.

In FIG. 14, the valve plug 74 is in a position such that an opening 80 is not in alignment with a duct 82 for receiving water flow. Thus, and in this case, the off/on valve will remain in the closed position and preclude water flow. However, by rotating the valve stem 74 through a 90° arc, to the position as shown in FIG. 15, the opening 80 becomes aligned with the duct 82 as shown. In this position, the valve plug 74 permits water flow therethrough.

In each of the above-identified embodiments of the invention, the off/on valve forming part of the sprinkler head, including the embodiments where the valve is in the sprinkler head base, or the pop-up shaft of a pop-up head, or located in a retrofitable coupling or other adaptive fitting, is effective. All of these arrangements allow the valve to be in an upstream position with respect to the insert and, in most cases, the filtering screen and thereby allows the valve to be opened and closed so that the insert and screen can be removed without causing water spraying on the attendant personnel. Thus, the necessity of walking back and forth to a remote site for purposes of opening and closing flow to the sprinkler head is thereby completely eliminated. In this way, maintenance personnel can shut down the water flow to the individual sprinkler head in order to remove and clean the insert and the screen, if necessary, and then shut off the water to re-establish water flow in order to flush out the head and then replace the insert, and again, re-establish water flow, to thereby perform the clearance operation and make any necessary adjustments, all without the necessity of moving from the proximity of the sprinkler head.

Thus, there has been illustrated and described a unique and novel water sprinkler head arrangement with an off/on water flow control valve and which thereby fulfills all of the objects and advantages which have been sought. It should be understood that there will be many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A sprinkler head assembly having off/on water flow control for turning water off and on at said sprinkler head assembly, without interrupting water flow to any adjacent sprinkler heads, said sprinkler head assembly comprising:

a) a generally upright tube which carries water from a subterranean water conduit;

b) a sprinkler head body associated with the generally upright tube and at least one of said sprinkler head and generally upright tube having a duct extending therethrough;

c) a nozzle located for allowing a directionalized spray of water from the subterranean conduit through the sprinkler head body; and d) off/on water flow control valve means comprising an elongate stem extending into said duct and being angularly located with respect to a central axis of the duct for stopping water flow when the stem is in a first rotatable position in said duct and reinitiating a flow of water through said sprinkler head assembly when said stem is rotated about a central axis of said stem to a second position which is rotatably located with respect to said first position independently of a main control therefor, thereby allowing servicing of said sprinkler head assembly without the need of controlling water flow at the main control therefor or shutting off water flow to other sprinkler head assemblies receiving water from that subterranean water conduit, said duct and said stem being arranged when in the second position to allow complete water flow without the nozzle present and to provide unobstructed passage for debris and also allow complete visual observation through said sprinkler head assembly when removed from said subterranean water conduit.

2. The sprinkler head assembly of claim 1 further characterized in that said off/on control valve means is located in an upstream position with respect to said nozzle.

3. The sprinkler head assembly of claim 1 further characterized in that said off/on control valve means is located in one of a body of the sprinkler head, or in a sprinkler head pop-up riser shaft, or in an adaptive fitting between the sprinkler head body and the generally upright tube, and said control valve means is in an upstream position with respect to said nozzle to thereby cut-off water flow before the nozzle.

4. The sprinkler head assembly of claim 1 further characterized in that said duct passes completely through said sprinkler head assembly, and said stem extends into said sprinkler head assembly and has a surface facing said duct in said assembly to block off water flow when said stem is in a first position in said duct and which allows water flow when said stem is rotated about its central axis so that an axis of said opening in said stem is aligned with the axis of the duct in said second position.

5. The sprinkler head assembly of claim 3 further characterized in that said off/on control valve means is located in a base of a shrub type stationary sprinkler head.

6. The sprinkler head assembly of claim 3 further characterized in that said control valve means is in a pop-up riser shaft which forms part of a pop-up sprinkler head and carries said nozzle at its upper end thereof.

7. The sprinkler head assembly of claim 1 further characterized in that said stem is angularly located with respect to an axis of said duct.

8. The sprinkler head assembly of claim 7 further characterized in that said duct has increased wall thickness and reduced diameter in the region of said flow control valve means.

9. An adaptive member for use with a sprinkler head assembly and having a valve means to provide off/on water flow control at said sprinkler head assembly, said adaptive member comprising:

a) a manually actuable on/off water flow control valve located in a position with respect to a generally vertically arranged tube having a duct associated with said assembly and in which water flows through said sprinkler head assembly;

b) an elongate stem forming part of said valve means extending into said duct and being located with respect to a central axis of said duct for stopping water flow when said stem is in a first position and reinitiating water flow when said stem is rotatably shifted about its central axis to a second position which is rotatably shifted to a second position with respect to said first position and independently of any main control for said water sprinkler system line; and c) a portion associated with said stem extending outwardly from said duct and being adjustable to control the position of the stem in said duct.

10. The adaptive member of claim 9 further characterized in that said stem has an opening aligned with said duct when said stem is in the second position and is out of communication with said duct when the stem is in the first position.

11. The adaptive fitting of claim 10 further characterized in that said generally vertically arranged tube is a riser tube and said fitting is attached to said riser tube which is used in or forms part of said sprinkler head assembly.

12. The adaptive fitting of claim 11 further characterized in that said off/on control valve forms part of said adaptive member and is located in a region of the generally vertically arranged tube or portion of said sprinkler head assembly and which has increased wall thickness in said duct in the region of said control valve with respect to the remaining portion of the duct.

13. The adaptive fitting of claim 10 further characterized in that said opening has a diametrical size approximately the same as the duct and which opening can be rotated in so that the opening is aligned with said duct to allow water flow and stops flow when the stem is rotated so that an axis of the opening is generally perpendicularly located to a central axis of said duct.

14. The method of claim 13 further characterized in that said method comprises removing said nozzle when water is turned off at said sprinkler head assembly, cleaning of the nozzle and re-introduction of the nozzle followed by initiating water flow again.

15. The sprinkler head assembly of claim 13 further characterized in that said stem is manually actuable and extends into said duct generally perpendicularly to a central axis of said duct.

16. The adaptive fitting of claim 15 further characterized in that said stem is threaded for manually turning said stem to cause said stem to rotate to said first position in said duct and to also rotate to said second position in said duct.

17. The adaptive fitting of claim 13 further characterized in that a tool receiving area is formed at an end of said plug to cause threaded turning of said stem in said duct.

18. The adaptive fitting of claim 17 further characterized in that said stem has a diametrical size at least as large as that of the duct.

19. The sprinkler head assembly of claim 9 further characterized in that the portion which extends outwardly is integral with said plug.

20. The sprinkler head assembly of claim 19 further characterized in that the portion which extends outwardly is both integral and axially aligned with said plug.

21. The sprinkler head assembly of claim 20 further characterized in that a manually engageable and manually actuable element is on said portion for moving said valve plug.

22. A method for turning water flow off and reinitiating water flow at a sprinkler head assembly and which eliminates the need to control water flow from a master controller or sprinkler valve in order to enable cleaning or servicing or replacement of that sprinkler head, said method comprising:

a) manually actuating a valve stem of an off/on water flow control valve means in a sprinkler head assembly connected to a subterranean water pipe to a first position where water flows therethrough;

b) rotating said valve stem and an opening in a valve stem forming part of said valve means to a second position where it is out of alignment with a duct of said assembly;

c) allowing for cleaning or servicing of said sprinkler head assembly with little or no water flowing through said assembly under pressure in the second position; and d) rotating said plug back to said first position so that the opening in said plug once again becomes aligned with the duct after cleaning or servicing to allow water flow to again commence through said sprinkler head.

23. The method of claim 22 further characterized in that said method comprises locating said off/on control valve means in a position upstream with respect to a nozzle on said sprinkler head assembly.

24. A sprinkler head assembly having off/on water flow control for turning water off and on at said sprinkler head assembly, without interrupting water flow to any adjacent sprinkler heads, said sprinkler head assembly comprising:

a) a generally upright tube which carries water from a subterranean water conduit;

b) a sprinkler head body at the upper end of the generally upright tube and said sprinkler head and generally upright tube having a duct extending there through;

c) a nozzle located at said sprinkler head body for allowing a directionalized spray of water from the subterranean conduit through the sprinkler head;

d) off/on water flow control valve means comprising an elongate stem extending outwardly to at least an exterior surface and extending inwardly into said duct; and when said stem is rotated to a second position about an axis of said stem and independently of a main control therefor, thereby allowing servicing of said sprinkler head assembly without the need of controlling water flow at the main control therefor or shutting off water flow to other sprinkler head assemblies receiving water from that subterranean water conduit; and e) an opening in said stem and permitting water flow through said duct and outwardly of the sprinkler head body when in a first position with respect to said duct and prevents water flow when in a second position with respect to said duct.

25. The sprinkler head assembly of claim 24 further characterized in that said stem is arranged when in the second position to allow complete water flow and to also allow unobstructed passage for debris and complete visual observation through said sprinkler head assembly when the nozzle is removed and when removed from said subterranean water conduit.

26. The sprinkler head assembly of claim 24 further characterized in that said off/on control valve means is located in one of a body of the sprinkler head, or in a sprinkler head pop-up riser shaft, or in an adaptive fitting between the sprinkler head body and the generally upright tube, and said control valve means is in an upstream position with respect to said nozzle to thereby cut-off water flow before the nozzle.

27. The sprinkler head assembly of claim 26 further characterized in that said duct passes completely through said sprinkler head assembly, and said stem extends into said sprinkler head assembly and has a surface facing said duct to block off water flow when said stem is in a first position in said duct and which allows water flow when said stem is rotated about its central axis so that an axis of said opening in said stem is aligned with the axis of the duct in said second position.

28. The sprinkler head assembly of claim 27 further characterized in that said off/on control valve means proportionally controls water flow through said duct when said stem is in positions between the first and second position.

29. The sprinkler head assembly of claim 26 further characterized in that said stem is angularly located with respect to an axis of said duct.

30. The sprinkler head assembly of claim 26 further characterized in that said duct has increased wall thickness and reduced diameter in the region of said flow control valve means.

31. The sprinkler head assembly of claim 30 further characterized in that the amount of water flow is proportional to the position of the stem between the first position and the second position.

* * * * *